(12) United States Patent
Ohk et al.

(10) Patent No.: US 8,064,654 B2
(45) Date of Patent: Nov. 22, 2011

(54) FACIAL REGION DETECTION DEVICE AND CORRECTION METHOD FOR PHOTOPRINTING

(75) Inventors: Cheol Ho Ohk, Seoul (KR); Hong Il Kim, Seoul (KR)

(73) Assignee: Sindoricoh Co., Ltd. (KR)

( * ) Notice: Subject to any disclaimer, the term of this patent is extended or adjusted under 35 U.S.C. 154(b) by 953 days.

(21) Appl. No.: 11/985,855

(22) Filed: Nov. 16, 2007

(65) Prior Publication Data

US 2009/0067682 A1    Mar. 12, 2009

(30) Foreign Application Priority Data

Nov. 17, 2006  (KR) .................. 10-2006-0113661

(51) Int. Cl.
*G06K 9/00*    (2006.01)
(52) U.S. Cl. ......... 382/118; 382/100; 382/167; 382/173
(58) Field of Classification Search .................. 382/100, 382/118, 167, 173, 254, 260, 276
See application file for complete search history.

(56) References Cited

U.S. PATENT DOCUMENTS

| | | | | |
|---|---|---|---|---|
| 7,684,630 | B2 * | 3/2010 | Steinberg | 382/243 |
| 7,702,136 | B2 * | 4/2010 | Steinberg et al. | 382/118 |
| 7,809,162 | B2 * | 10/2010 | Steinberg et al. | 382/103 |
| 7,912,245 | B2 * | 3/2011 | Steinberg et al. | 382/103 |
| 2003/0223622 | A1 * | 12/2003 | Simon et al. | 382/118 |

* cited by examiner

*Primary Examiner* — Stephen Koziol
(74) *Attorney, Agent, or Firm* — Harness, Dickey & Pierce, P.L.C.

(57) ABSTRACT

Disclosed is a method for correcting a facial region detected from image data for photoprinting of improved image quality. The method includes an image data input step of inputting the image data to an image processing device; facial region detection step of extracting a skin color region from the inputted image data and detecting a planar face or a rotated planar face from a face-existing candidate region; a region division step of dividing the facial region detected in the facial region detection step; a correction step of extracting a distortion data value from the region divided in the region division step and conducting correction; and a photoprinting step of visually outputting the image data finally corrected in the correction step. Various types of distortion of the facial image is effectively corrected before it is printed by a photoprinter so that the image quality is improved.

4 Claims, 3 Drawing Sheets

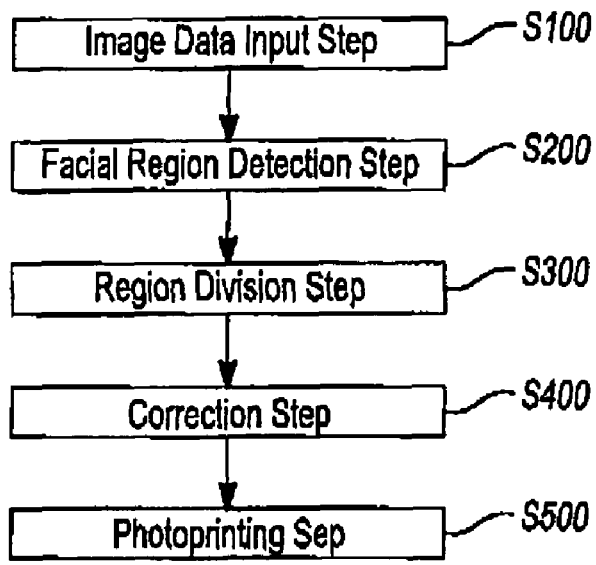
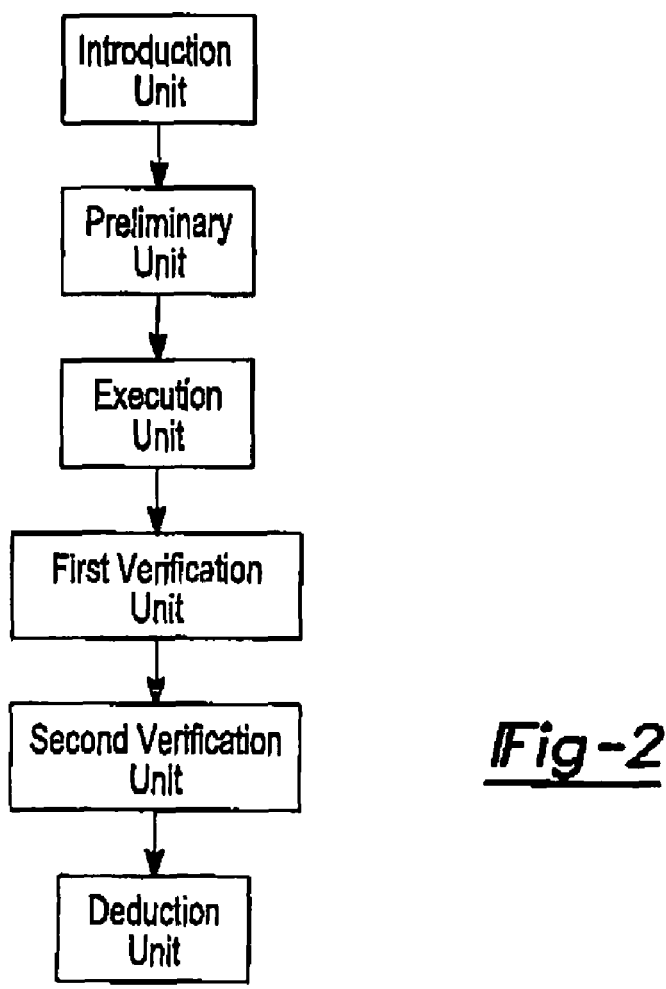

FACIAL REGION DETECTION DEVICE AND CORRECTION METHOD FOR PHOTOPRINTING

CROSS-REFERENCE TO RELATED APPLICATION

The entire disclosure of Korean Patent Application No. 10-2006-0113661 filed Nov. 17, 2006 is hereby incorporated by reference.

BACKGROUND OF THE INVENTION

1. Field of the Invention

The present invention relates to an image data processing method for printing digital facial images of improved quality, and more particularly to a facial region detection device and a correction method for photoprinting, which is a type of image processing technology for detecting and separating a facial region from inputted image data and conducting various kinds of distortion and color correction.

2. Description of the Prior Art

As generally known in the art, digital imaging systems have been widely used recently, and they can not only conduct compression and storage, but also improve and modify image quality through image processing.

When digital images are to be printed by a photoprinter based on the processing by a digital imaging system, color distortion or any other undesirable factors existing in facial images are preferably removed so that the printed facial images have better quality than what is supported by the performance of the photoprinter itself.

Such image processing systems for photoprinters have been extensively studied by various corporations manufacturing printers and cameras. Conventional technologies in this regard are commonly characterized in that a facial region is separated based on the skin color distribution and typical facial patterns, and the separation process is followed by color correction, which primarily aims at correcting the red-eye effect, lips, skin color, hair color, etc.

However, the prior art has a problem in that, when the face has been rotated in the image data, the face is not correctly detected. In addition, although the red-eye effect and the darkening of skin color by backlight are corrected, no correction is conducted with regard to the reflection caused by flashing or lighting. When images are stored at a high compression ratio with low image quality, the block boundaries are created.

SUMMARY OF THE INVENTION

Accordingly, the present invention has been made to solve the above-mentioned problems occurring in the prior art, and the present invention provides a facial region detection device and a correction method for photoprinting, wherein rotation-irrelevant facial characteristics are used to provide a rotation-robust technique for detecting the face and separating a facial region, the reflection of lighting by a region or the gloss of skin is extracted/removed to reproduce the original color, and the block formation occurring when images are stored at a high compression ratio with low image quality is avoided.

In accordance with an aspect of the present invention, there is provided a method for correcting a facial region detected from image data for photoprinting of improved image quality, the method including an image data input step of inputting the image data to an image processing device; a facial region detection step of extracting a skin color region from the inputted image data and detecting a planar face or a rotated planar face from a face-existing candidate region; a region division step of dividing the facial region detected in the facial region detection step; a correction step of extracting a distortion data value from the region divided in the region division step and conducting correction; and a photoprinting step of visually outputting the image data finally corrected in the correction step.

The correction step includes the steps of extracting and removing a red-eye effect and a total-reflection component from the extracted data, restoring an irregular-reflection component corresponding to an original color, and expressing the total-reflection component and the irregular-reflection component based on a dichromatic model; extracting a block boundary phenomenon and linearly removing the block boundary phenomenon by a filter; adjusting brightness of the face based on brightness value distribution and adjusting brightness contrast of an facial image based on histogram flattening; and adjusting image quality of the facial image by a low-pass filter.

In accordance with another aspect of the present invention, there is provided a device for detecting a facial region for photoprinting, the device including an introduction unit for inputting a color image due for facial detection; a preliminary unit for extracting a skin color region from the inputted color image and determining a circular face-existing candidate region; an execution unit for dividing the circular face-existing candidate region into respective components and extracting a face candidate region conforming to facial characteristics based on a sum of edge projection components inside the divided region; a first verification unit for dividing the face candidate region extracted by the execution unit into three circular division regions and verifying the face candidate region by filtering out erroneous results based on brightness characteristics of the face near eyes; a second verification unit for dividing the face candidate region verified by the first verification unit into two circular division regions, obtaining an average of edge components of an image corresponding to a vertical section in the two circular division regions to provide two left/right vertical histograms, obtaining an average of edge components of an image corresponding to a horizontal section to provide a horizontal histogram, and finally verifying the face region; and a deduction unit for deducting information regarding a location, a size, and a rotational angle of the face from the image obtained by the second verification unit.

The second verification unit is adapted to use only an upper region of the face in the vertical and horizontal regions, eyes existing in the upper region.

The vertical histograms have two peaks resulting from characteristics of edge components near eyes and mouth in the face and are horizontally symmetric.

The horizontal histogram has a horizontally-symmetric peak resulting from characteristics of edge components near eyes in the face.

BRIEF DESCRIPTION OF THE DRAWINGS

The above and other objects, features and advantages of the present invention will be more apparent from the following detailed description taken in conjunction with the accompanying drawings, in which:

FIG. 1 is a flowchart showing a method for detecting a facial region from image data and correcting it according to the present invention;

FIG. 2 is a flowchart showing a step for detecting a facial region according to the present invention;

DETAILED DESCRIPTION OF THE EXEMPLARY EMBODIMENTS

Figure 3:
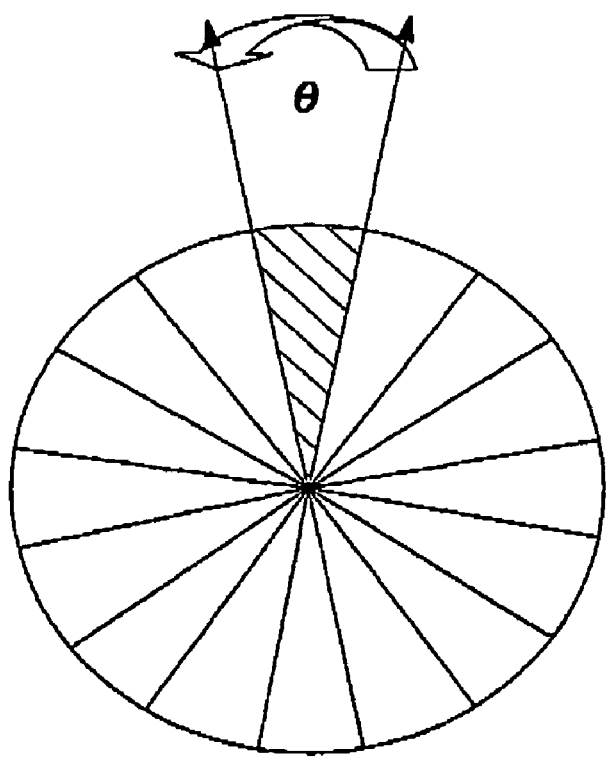
FIG. 3 shows a directional circular window for searching for a candidate region in which the face is likely to exist together with the angle of rotation of the face according to the present invention.

Hereinafter, an exemplary embodiment of the present invention will be described with reference to the accompanying drawings. In the following description and drawings, the same reference numerals are used to designate the same or similar components, and so repetition of the description on the same or similar components will be omitted.

Figure 4:
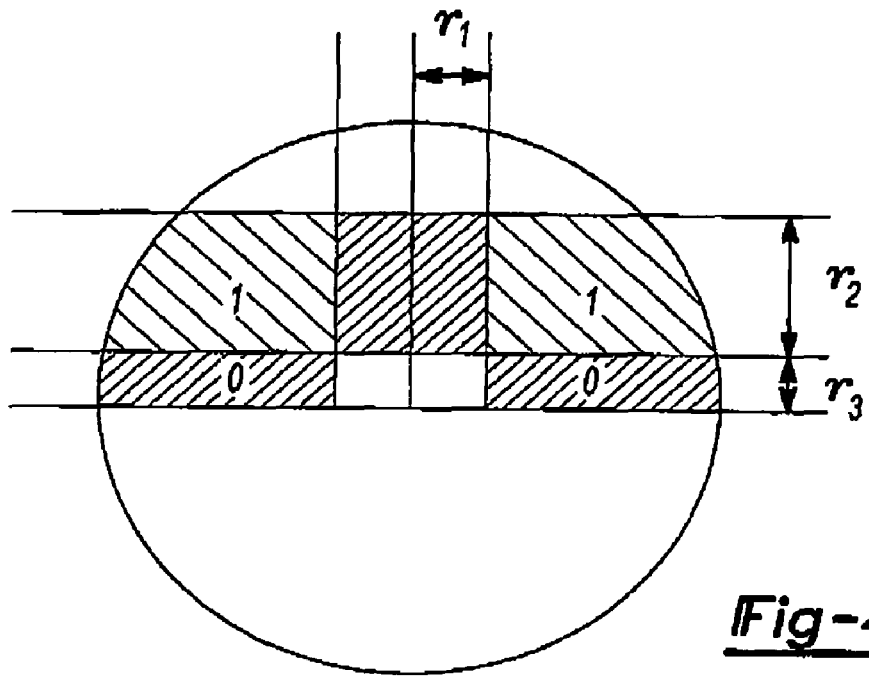
FIGS. 4 and 5 show circular windows for verifying candidate regions in which the face is likely to exist according to the present invention.
Figure 5:
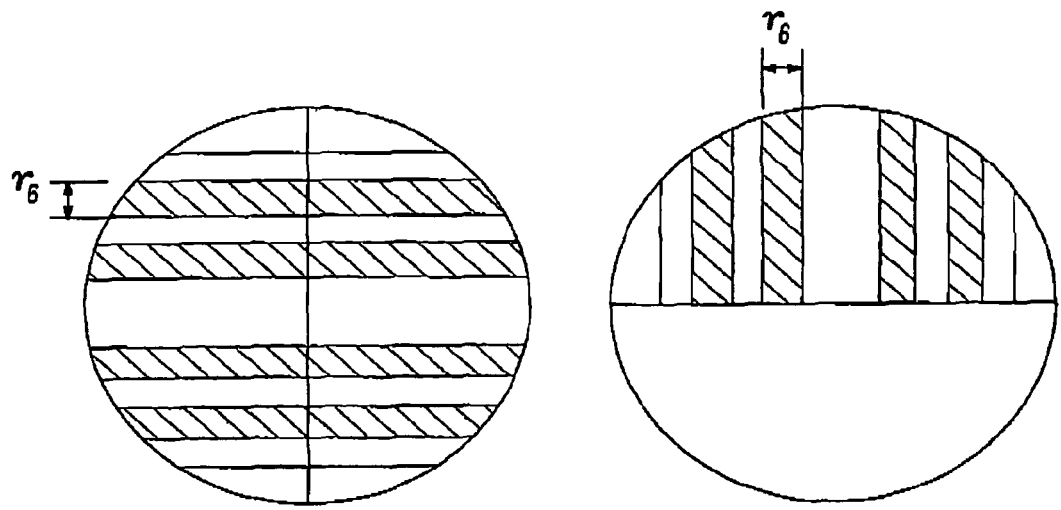
Figure 6:
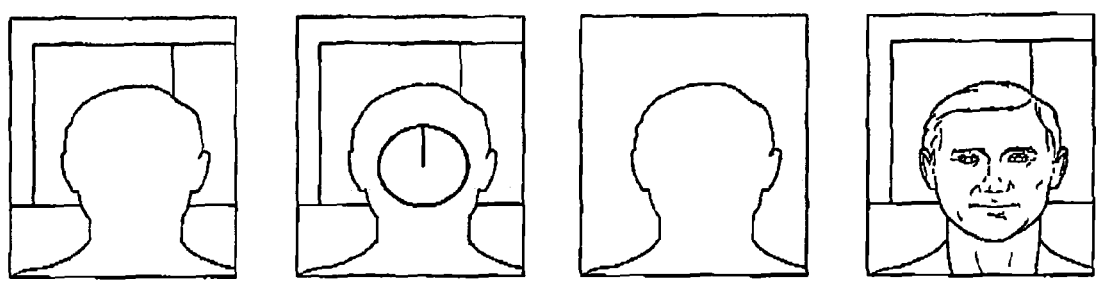
FIG. 6 shows a facial region detection process and the result of correction according to the present invention.

FIG. 1 is a flowchart showing a method for detecting a facial region from image data and correcting it according to the present invention; FIG. 2 is a flowchart showing a step for detecting a facial region according to the present invention; FIG. 3 shows a directional circular window for searching for a candidate region in which the face is likely to exist together with the angle of rotation of the face according to the present invention; FIGS. 4 and 5 show circular windows for verifying candidate regions in which the face is likely to exist according to the present invention; and FIG. 6 shows a facial region detection process and the result of correction according to the present invention.

Referring to FIG. 1, a method for detecting a facial region from image data and correcting it for the purpose of photoprinting of improved image quality according to the present invention includes an image data input step (S100) of inputting image data to an image processing device; a facial region detection step (S200) of extracting a skin color region from the inputted image data and detecting a planar face or a rotated planar surface from a candidate region in which the face is likely to exist; a region division step (S300) of dividing the facial region detected in the facial region detection step; a correction step (S400) of extracting a distortion data value from the region divided in the region division step and correcting it; and a photoprinting step (S500) of visually outputting the image data, which has been finally corrected in the correction step.

In the facial region detection step (S200), information including the location, size, and direction of rotation of the face is extracted from an image.

A front face and an almost-front face are extracted. To this end, technology for detecting a facial region when the face has a rotation angle of up to 360° relative to the image plane is employed.

The facial region detection step (S200) will now be described in more detail with reference to FIG. 2. An introduction unit is used to input a color image from which the face is to be detected, and a preliminary unit is used to extract a skin color region from the inputted color image to determine if it can be a candidate region in which the face is likely to exist.

The skin color varies depending on the race and individual. It is generally known in the art that, if color components are analyzed in terms of the RGB (Red, Green, Blue) domain, each individual exhibits greatly varying skin color characteristics, from which common features are hardly found.

However, when RGB signals are separated into a luminance signal Y and chrominance signals Cb and Cr (also referred to as Pb and Pr), the skin color exhibits specific distribution characteristics in the Cb and Cr region.

This can be modeled by determining the maximum and minimum vales in the two color regions (i.e. Cb and Cr regions) as $[cb_{min}, cb_{max}]$ and $[cr_{min}, cr_{max}]$ in the following manner to find out the skin color.

However, when the actual modeling is conducted by using the skin color data, the color region distribution is similar to an ellipse, not a rectangle.

Therefore, such an elliptical region is determined as the skin color region to be found.

Then, an execution unit divides the circular candidate region into respective components as shown in FIGS. 3-5 so that, based on the sum of edge projection components within the divided regions, candidate face regions conforming to the facial characteristics are extracted.

In other words, the skin color region found based on the task by the preliminary unit becomes the candidate regions from which the face is to be detected. The objective is to find the front face regardless of rotation. The angle of rotation of the face is also obtained.

A directional circular window as shown in FIG. 3 is used to make use of the structural characteristics of the face and also obtain the rotational angle.

Referring to FIG. 3, the circular window is divided into regions in the angular direction θ, and the average of components in each region is compared. The components refer to the edge values of the eyes and mouth in the image.

In other words, when components are obtained in the angular direction θ, there appear edge component characteristics peculiar to the face. This means that edge components are intensely distributed near the eyes and mouth.

Such characteristics are described in terms of a histogram, and the angle of rotation of the face can be obtained by simply moving the histogram leftward/rightward. The resulting histogram conforms to the above-mentioned structural characteristics of the face.

In addition, a rotational angle region histogram is used to find the face, as well as obtain the rotational angle.

However, this process alone may result in erroneous detection, i.e. other portions may be erroneously detected as the face. This is because natural images frequently have components similar to the rotational angle region histogram specific to the face.

Therefore, according to the present invention, the candidate face regions go through first and second verification units to remove portions that are not the face.

Referring to FIG. 4, the first verification unit divides each candidate region, which has been obtained by the execution unit, into three regions and verifies it based on the brightness characteristics of the face near eyes so that inappropriate candidates are filtered out.

In other words, the first verification unit employs a division window shown in FIG. 4 to prevent detection errors that may occur if the execution unit searches for the face solely based on the rotational angle components. Since the execution unit has already obtained the rotational angle, the division window shown in FIG. 4 is rotated as much as that angle and is applied to the candidate face images.

It is clear from FIG. 4 that the circular window has three symmetric regions (0, 1, and 2). Considering that the periphery of eyes appears dark, the brightness characteristics near the eyes are put to use.

Particularly, face candidates are divided based on the brightness characteristics of eye regions (1, r2) and near-eye regions (0, r3, 2, and r1) to determine if they conform to the facial characteristics.

The left/right symmetry of the eye regions (1, r2) is also put to use. In this manner, the brightness of a total of six regions is compared to find candidates conforming to the facial characteristics and remove others.

The second verification unit divides each region in terms of horizontal and vertical axes as shown in FIG. 5. Then, the second verification unit obtains the sum of brightness components corresponding to each region, extracts characteristics both horizontally and vertically, compares them with the facial characteristics, and finally verifies the face candidates that have gone through the execution unit and the first verification unit.

More particularly, second verification proceeds with regard to face candidates that have passed the first verification unit. This means that, although a considerable number of candidates have been filtered out in the first step, another verification step follows for a higher level of filtering. To this end, two circular divided windows are used as shown in FIG. 5.

The section R/σ is divided in the vertical direction, and the image edge components of the eyes and mouth belonging to that section R/σ are averaged to obtain corresponding histograms (left and right histograms).

The section R/σ is then divided in the horizontal direction, and the image edge components of the eyes and mouth belonging to that section R/σ are averaged to obtain a corresponding histogram. In this case, the lower region of the face near the mouth is discarded, and the upper region near the eyes is put to use.

In the case of the vertical histograms, the fact that they characteristically have two peaks due to the strong edge components near the eyes and mouth is used for the verification.

The fact that both histograms must have symmetric characteristics is also put to use. Finally, in the case of the horizontal histogram, the strong edge component near the eyes requires that the histogram have a peak near the eyes, which is symmetric in the horizontal direction. These characteristics are used to complete the final verification step.

A deduction unit is used to deduce information (location, size, and rotational angle) regarding the final face region, which has passed the execution unit, the first verification unit, and the second verification. This information is useful for other imaging works.

The correction step (S400) according to the present invention is conducted in the following manner.

Firstly, the red-eye effect is removed. Particularly, the eyes are located in the detected face region, and it is confirmed whether or not the red-eye effect has occurred. As widely known in the art, the red-eye effect occurs when the pupils reflect light and appear red during lighting, and is one of very frequent distortion factors in facial images.

According to the present invention, after the detected eyes are located, it is confirmed whether or not they appear red and, if so, the red component is removed so that the pupils appear black.

Then, a step for removing and correcting lighting reflection components is conducted. In general, color information can be expressed as the linear combination of a total-reflection component and an irregular-reflection component.

The irregular-reflection component corresponds to the original color of the surface of an object, and the total-reflection component corresponds to the gloss caused by peripheral lighting.

The total-reflection component results from strong reflection with regard to lighting, and, as a result, the color information (i.e. irregular-reflection component) is partially lost.

Portions of the face having strong total-reflection components include glasses, the forehead, and eyes. The entire facial skin may also be glossed.

The present invention employs a conventional dichromatic reflection model to separate the total-reflection component and the irregular-reflection component, and corrects image regions having severe total-reflection by estimating the original color information.

Then, a block boundary removal step follows. An image compression scheme such as JPEG is block-based, and, in the case of a high compression ratio with low image quality, the compressed images have noticeable block boundaries.

Since such a block boundary phenomenon is not visually favorable, the present invention detects it prior to photoprinting and removes it by a conventional removal filter.

Then, the darkening of skin by backlight is corrected. Particularly, the facial images tend to become excessively dark or bright in the case of backlight, dark surroundings, or excessive influx of light. As a result, the brightness contrast of the facial region degrades.

Therefore, the bright distribution of the detected facial region is measured, and, if it is excessively dark or bright, a conventional histogram uniformizing technique is employed to increase the bright contrast and improve the image quality of the facial region.

Finally, a fleck removal step is conducted so that the image of the forehead or check, for example, preferably appears smooth and even.

Particularly, if the face has a lot of flecks or if the obtained image has severe noise, it is important to remove them efficiently. To this end, according to the present invention, the corresponding facial region (e.g. forehead or check) is subjected to a low-pass filter to remove the noise and flecks.

It is clear from FIG. 6 that, after a facial region is detected from image data and corrected, the quality of the facial image is improved (i.e. it becomes brighter).

As mentioned above, the present invention is advantageous in that, before a facial image is printed by a photoprinter, the distortion of color components existing in the facial region, including noise, is removed to improve the image quality and provide a more excellent and satisfactory facial image.

In addition, the image processing according to the present invention makes it possible to print improved images without modifying the function of the photoprinter and improving the color expression of the color toner. Particularly, strong distortion of facial images, including the red-eye effect, block boundary phenomenon, reflection, and gloss, is removed so that facial images can be printed correctly. The skin color correction function and low-pass filtering also guarantee improved facial images. Such a series of image processing steps requiring skilled operations can be automated so that anyone can easily print better facial images.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A device for detecting a facial region for photoprinting, the device comprising:
   an introduction unit for inputting a color image due for facial detection;
   a preliminary unit for extracting a skin color region from the inputted color image and determining a circular face-existing candidate region;

an execution unit for dividing the circular face-existing candidate region into respective components and extracting a face candidate region conforming to facial characteristics based on a sum of edge projection components inside the divided region;

a first verification unit for dividing the face candidate region extracted by the execution unit into three circular division regions and verifying the face candidate region by filtering out erroneous results based on brightness characteristics of the face near eyes;

a second verification unit for dividing the face candidate region verified by the first verification unit into two circular division regions, obtaining an average of edge components of an image corresponding to a vertical section in the two circular division regions to provide two left/right vertical histograms, obtaining an average of edge components of an image corresponding to a horizontal section to provide a horizontal histogram, and finally verifying the face region; and a deduction unit for deducting information regarding a location, a size, and a rotational angle of the face from the image obtained by the second verification unit.

2. The device as claimed in claim 1, wherein the second verification unit is adapted to use only an upper region of the face in the vertical and horizontal regions, eyes existing in the upper region.

3. The device as claimed in claim 1, wherein the vertical histograms have two peaks resulting from characteristics of edge components near eyes and mouth in the face and are horizontally symmetric.

4. The device as claimed in claim 1, wherein the horizontal histogram has a horizontally-symmetric peak resulting from characteristics of edge components near eyes in the face.

* * * * *